Figure 1:
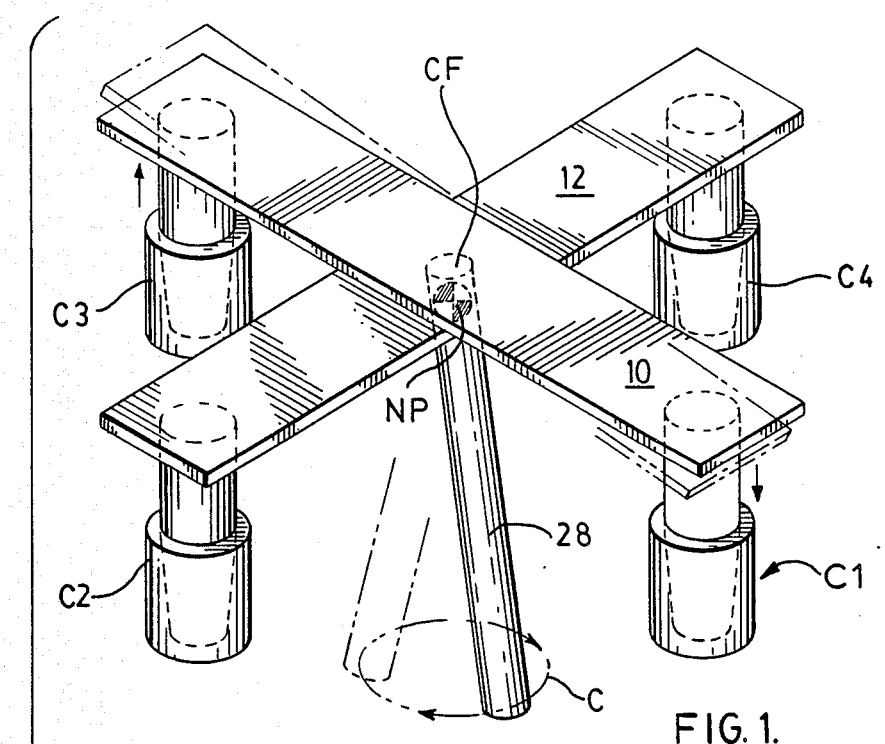

United States Patent [19]

Armstrong

[11] Patent Number: 4,928,576

[45] Date of Patent: May 29, 1990

[54] COMPRESSED GAS MOTOR

[76] Inventor: Richard J. Armstrong, 1216 Yonge Street, Suite 102, Toronto, Ontario, Canada, M4T 1W1

[21] Appl. No.: 187,362

[22] Filed: Apr. 28, 1988

Related U.S. Application Data

[63] Continuation-in-part of Ser. No. 31,358, Mar. 30, 1987, Pat. No. 4,852,418.

[51] Int. Cl.⁵ .............................. F01B 3/02; F16J 1/00
[52] U.S. Cl. ....................................... 91/499; 91/152; 92/172
[58] Field of Search ..................... 91/152, 499; 92/172, 92/177, 209; 123/58 BA, 193 CP, 193 P; 417/265, 269

[56] References Cited

U.S. PATENT DOCUMENTS

| | | | |
|---|---|---|---|
| 1,553,022 | 9/1925 | Benson | 91/499 X |
| 2,133,270 | 10/1938 | Blum | 91/499 X |
| 2,198,552 | 4/1940 | Rieger | 91/152 X |
| 2,625,115 | 1/1953 | Maloney | 92/172 X |
| 2,640,432 | 6/1953 | Chappelle | 92/172 X |
| 3,514,221 | 5/1970 | Hasquenoph et al. | 417/265 X |

Primary Examiner—Michael Koczo

[57] ABSTRACT

Compressed gas is used to reciprocate pistons arranged around a nutation frame which is driven cyclically by the piston to provide a rotary output to drive a motor shaft. The cylinders have tapering walls to assist thermal flow to the gas to prevent condensation. Where the gas expansion takes place in stages, different cylinders may be dimensioned to operate under different stages of expansion of the gas.

16 Claims, 6 Drawing Sheets

COMPRESSED GAS MOTOR

This application is a continuation-in-part of Application Ser. No. 031,358, filed Mar. 30, 1987, Pat. No. 4,852,418.

This invention relates to a particular application for a compressed gas engine using a nutation drive.

In a nutating drive a plate or frame is mounted on a universal joint (allowing limited universal movement about a nutation point) with the plate or frame controlled to slope at an angle to an axis known as the nutation axis through the nutation point while the direction of slope (although not necessarily the plate or frame) is rotated continually about the nutation axis. The plate or frame is connected to a plurality of reciprocating members, whose reciprocation axis is generally aligned with the axis of symmetry, then reciprocation of the members in proper phase relationship will cause rotation of the slope of the plate or frame and a connection from the plate or frame may be used as a power take off to provide rotary drive for an output shaft.

As the plate or frame continually rotates its 'nodding' direction in a 360° azimuth the axis about which such azimuth angle is measured is known as the nutation axis. The nutation axis need not correspond to the rotation axis however such correspondence appears to provide the most practical and symmetrical solutions. Unless stated herein the nutation axis will correspond to the rotation axis of the output shaft.

The compressed gas engine herein described may be driven by many compressed gases subject only to limitations due to such obvious factors that the gas used should not be noxious, a pollutant, corrosive, explosive, or flammable. Obvious choices are carbon dioxide ($CO_2$ hereafter) and nitrogen. However the expense of nitrogen is such that it is prohibitive relative to the preferred gas, $CO_2$.

It is an object of the invention to provide a piston and cylinder suitable for operation with a compressed $CO_2$ gas source. It will be noted that the piston and the inner side walls of the 'cylinder' are complementary truncated cones. 'Cylinder' hereintherefore refers to the enclosing walls for the chamber even though geometrically the walls are conical. Such piston and its complementary cylinder are sometimes collectively referred to herein as a 'set'. The 'chamber' herein is the space varying during reciprocation between piston and cylinder walls.

It is an object of the invention to provide a compressed gas source, a group of three or more piston-cylinder sets suitable for operation by expansion of gas from a compressed gas source with the power of the expansion of the gas in the chamber used to cause nutation of a frame which in turn causes rotation of a power output shaft. An advantage of using nutation drive to convert the reciprocating motion of the piston-cylinder sets into rotating drive is that much shorter reciprocation strokes may be tolerated than if a crankshaft (the conventional way of converting reciprocating to rotary motion) is used.

One of the problems with the use of a compressed gas source in a piston cylinder is that heat must be supplied to the expanding gas in the cylinder at a rate to prevent it from condensing and causing substantial reduction in expansion.

With reference to the premises of the two previous paragraphs, the invention provides a piston-cylinder set wherein the piston and cylinder provide opposed walls tapering at an angle of less than 45° to the reciprocation axis. The piston and cylinder are further designed so that most of the chamber in any of its various volumes from contracted to expanded position of the piston is defined by the sloping walls. Thus there is preferably no flat area at the free end of the piston communicating with the inside of the chamber. Preferably such flat area is avoided by providing a uniform cross-section extension or stem of the piston; extending from its narrow end in the contraction direction and reciprocating in a complementary bore defined in the end of the chamber, so that the side walls of such extension form the innermost boundary of the chamber over the extent of the piston stroke.

By 'longitudinal section' herein I mean the section shown in a plane including the reciprocation axis of a cylinder.

It is therefore an object of this invention to provide a piston and cylinder for using the force of expanding gas to drive a piston where the piston and cylinder are designed to provide a chamber between piston and cylinder walls sloping at an angle of less than 45° (and preferably less than 10°) to the reciprocation axis. There is thus produced a piston chamber shaped like a thin truncated conical sleeve of substantial axial extent and annular in section which can use a correspondingly large axially extending area of the cylinder wall to transmit ambient heat to prevent condensation of the gas.

The advantages of this feature are enhanced where, as in the preferred embodiment, the chamber walls are made of high thermal conductivity material and preferably of metal. The thin expansion space defined by predominantly axially extending walls only allows for a very short piston stroke. However as previously explained this is acceptable with and indeed suitable for use with a nutation drive.

The nutation drive with which the inventive cylinder is used comprises a nutation frame designed to nutate about a nutation point preferably located on the projection of the engine shaft output axis and defining a nutation axis usually corresponding to the rotation axis. The nutation axis is nearly and preferably substantially parallel to the reciprocation axes of three or more piston-cylinder sets whose axes are spaced about the nutation axis. A rod or equivalent linkage means connects the movable component of each piston-cylinder set to a connection point on the nutation frame, the points on the nutation frame being spaced outwardly and angularly disposed relative to each other about the nutation point. (For brevity discussion of the piston as the moving member and the cylinder defining structure as the stationary member, will be assumed to include the obvious alternative where the piston is stationary and the cylinder moves and is connected to drive the nutation frame.) (In some embodiments of the invention the reciprocation axes and connection points although showing two part symmetry about the rotation axis are equiangularly spaced with different radii from the rotation axis.) The rod or linkage between piston and nutation frame must be joined at each end in such a way to allow for the difference in motion between the reciprocating piston and the nutating frame. The junction also allows for the limited reciprocating angular motion of the nutation frame which is a peculiarity of nutating motion. The pistons are activated in regular time sequence in a phase relationship corresponding to their sequential angular disposition about the nutation point, the nutation frame is thus caused to nutate about the nutation point by the reciprocation of the pistons. Thus any point forming part of the frame and displaced axially relative to the output shaft axis from the nutation point, will describe a circle and may be used as a rotary power take off for the engine.

It may be here noted that one of the preferred applications of the inventive combination of the piston-cylinder having tapering walls and a nutation drive using compressed $CO_2$ is in a marine outboard motor, whereby an efficient non-polluting drive is obtained. In such application, the heat required for the expansion chamber is to prevent $CO_2$ condensation, and the heat is available in effectively infinite quantities from the water surrounding the engine and is conducted to the chamber through the conical cylinder walls and also the piston, both of which are formed in extended shape to provide a large area for such heat flow.

In the preferred form of the invention, using $CO_2$ as the compressed gas, the usual pressure of the $CO_2$ supply is about 830 pounds per square inch absolute ('p.s.i.a.' hereafter). The expansion of this gas in its transition to atmospheric pressure is about 100 times. The expansion creates two problems. First the cooling caused by such expansion must be compensated for by ambient heat supplied at a rate to prevent condensation of the $CO_2$. Secondly the expansion of 100 times, affects the required piston chamber size.

In a preferred embodiment of the invention both problems arising from the large expansion are reduced by using multiple gas expansion stages each comprising one or more piston-cylinder sets. Thus the expansion and the cooling of the gas is distributed over two or more stages and may, as described hereafter, be distributed over two or more piston-cylinder sets per stage. It will be noted that multiple stages of piston-cylinder sets involving corresponding multiple chamber wall areas increase the thermal conduction area for heat flow to the gas expansion areas. If two piston-cylinder sets are used for a given stage then the thermal flow cross section will be larger than if that stage had used a single, larger piston-cylinder set to provide the same chamber volume. such multi-stage drive is suitable for use with other compressed gases than $CO_2$.

The multi-stage drive is exemplified in its preferred form by a $CO_2$ nutation engine using four piston-cylinder sets each having a corresponding piston reciprocating on preferably parallel reciprocation axes preferably disposed at 90° angular intervals about the output shaft rotation axis and parallel thereto. In accord with the preferred arrangement including the selected stages, one piston-cylinder set acts as the first expansion stage, that is expansion of the gas from about 839 p.s.i.a. down to about 290 p.s.i.a. A second piston-cylinder set preferably, 180° angularly disposed from the first corresponds to the second stage of expansion of the $CO_2$ gas. Thus the gas exhausted from the first stage at about 290 p.s.i.a. is again expanded in the second stage, there encompassing a drop to about 67 p.s.i.a. The larger volume required for the gas in the second stage is accommodated by making the cylinder longer and increasing the angle of the chamber wall to the reciprocation axis. The volume of the piston chamber varies as the length of the cylinder also varies as sin A where A is the angle between the chamber wall and the reciprocation axis. (The volume also of course varies as the stroke length but in the preferred embodiment this is equal in the first and third cylinder). (The volume also varies as the diameter of the large end of the cylinder. This does not vary in the cylinders of stages one and two although it is increased for the cylinder of stage three).

The third stage is comprised by the other two piston-cylinder sets disposed at 90° and 270° both in angle about the rotation axis and operating phase angle from the first stage. In each of these, the gas as it is exhausted from the second stage cylinder is allowed to expand from about 67 p.s.i.a. to atmosphere pressure at about 15 p.s.i.a.

Valves, storage areas and timing controls are provided to control the flow of the gas into, out of each stage, and between stages. In the third stage the chamber wall angle and the length and the diameter of the cylinder large end are again selected to determine the volume of the chambers which are preferably of equal size. In addition the volume of the third stage chambers is further preferably increased by making the stroke longer than for the first and second stage pistons. The stroke is made longer by placing the reciprocation axis farther from the nutation point. The third stage, longer stroke, cylinders are opposed to each other so that the 'stroke length' disposition of the cylinders is balanced relative to the nutation point and rotation axis providing two-way rather than four-way symmetry thereabout.

It will be realized that the number of stages, the pressure drop per stage and the geometry of the piston linkages and stages are a matter for design and the broad scope of the invention includes such variables.

'Rearward' herein corresponds to the direction that the output shaft projects relative to the nutation point and 'forward' is the opposite direction.

Figure 2:
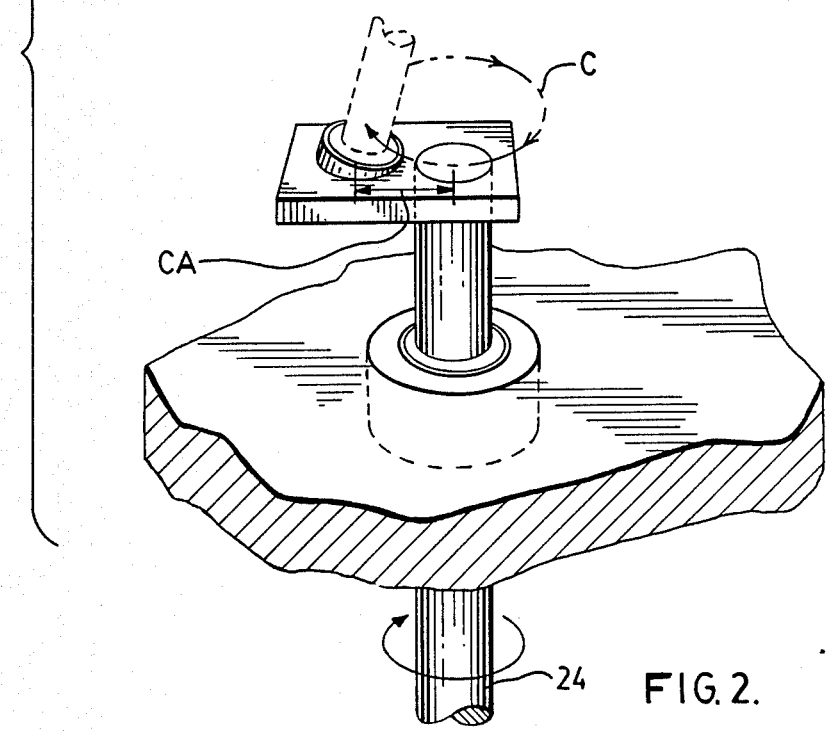
Figure 3:
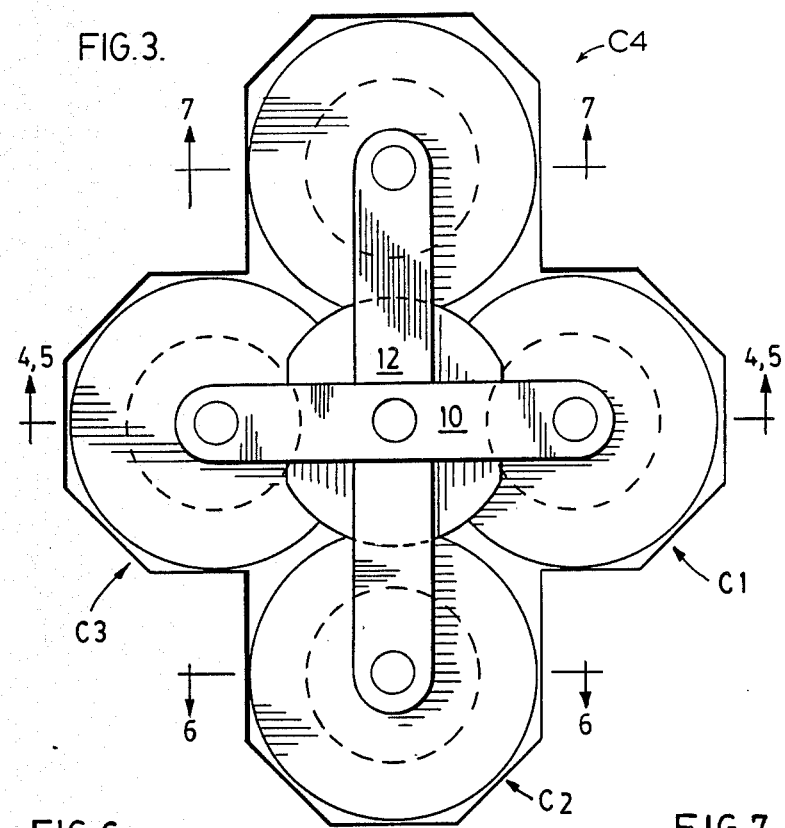
Figure 6:
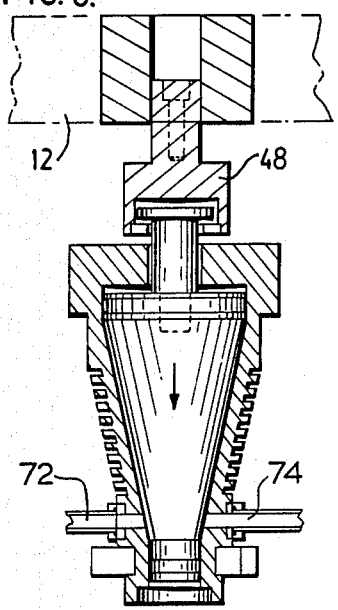
Figure 7:
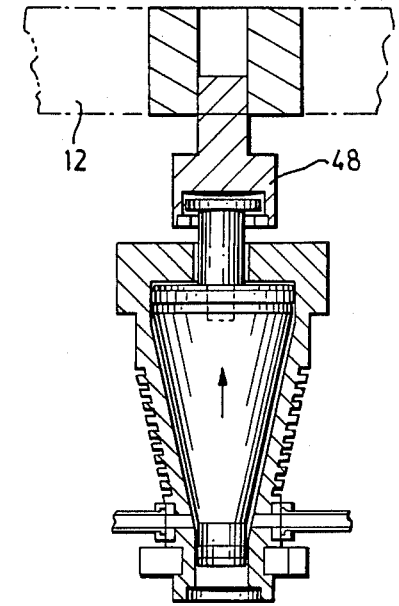
Figure 4:
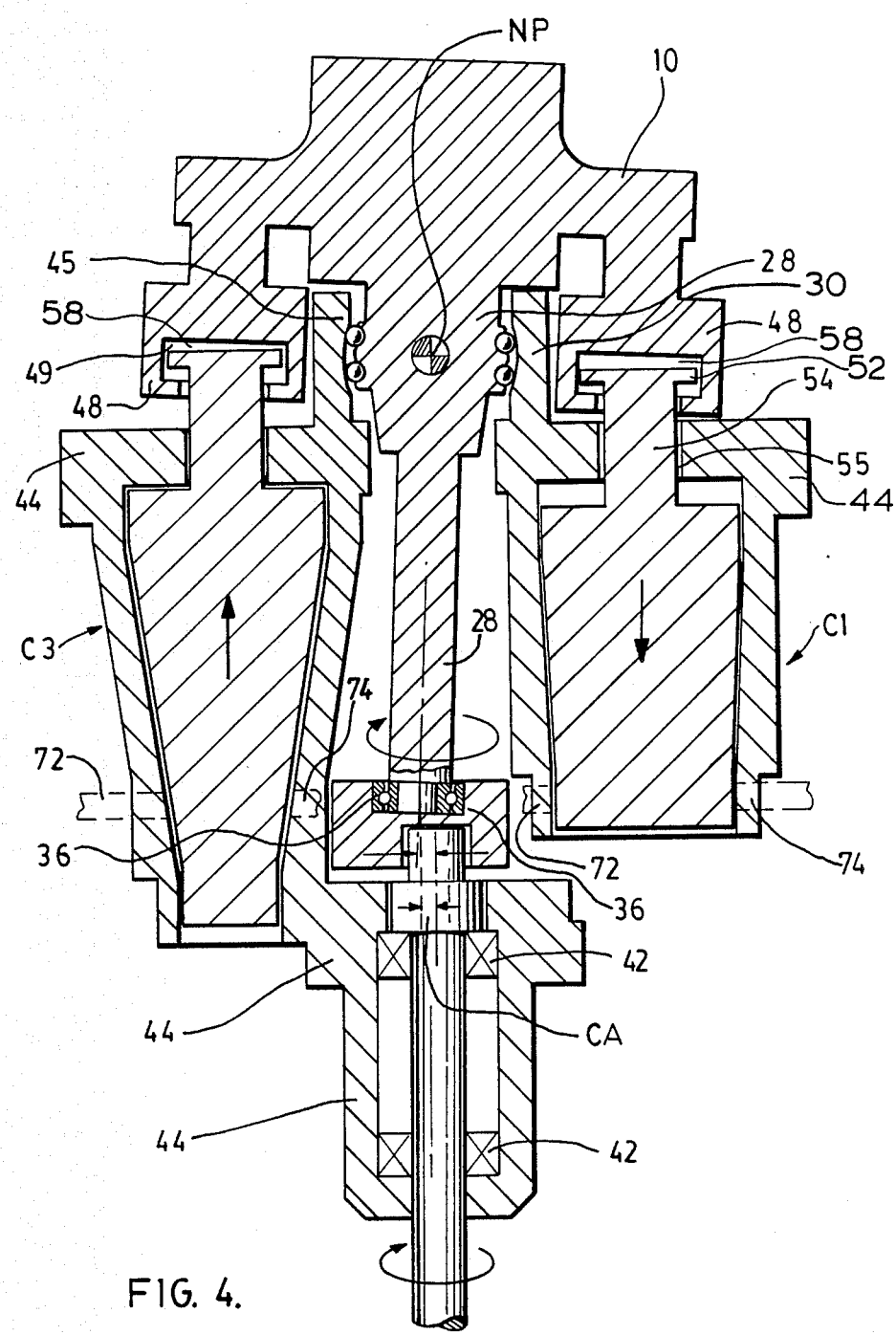
Figure 5:
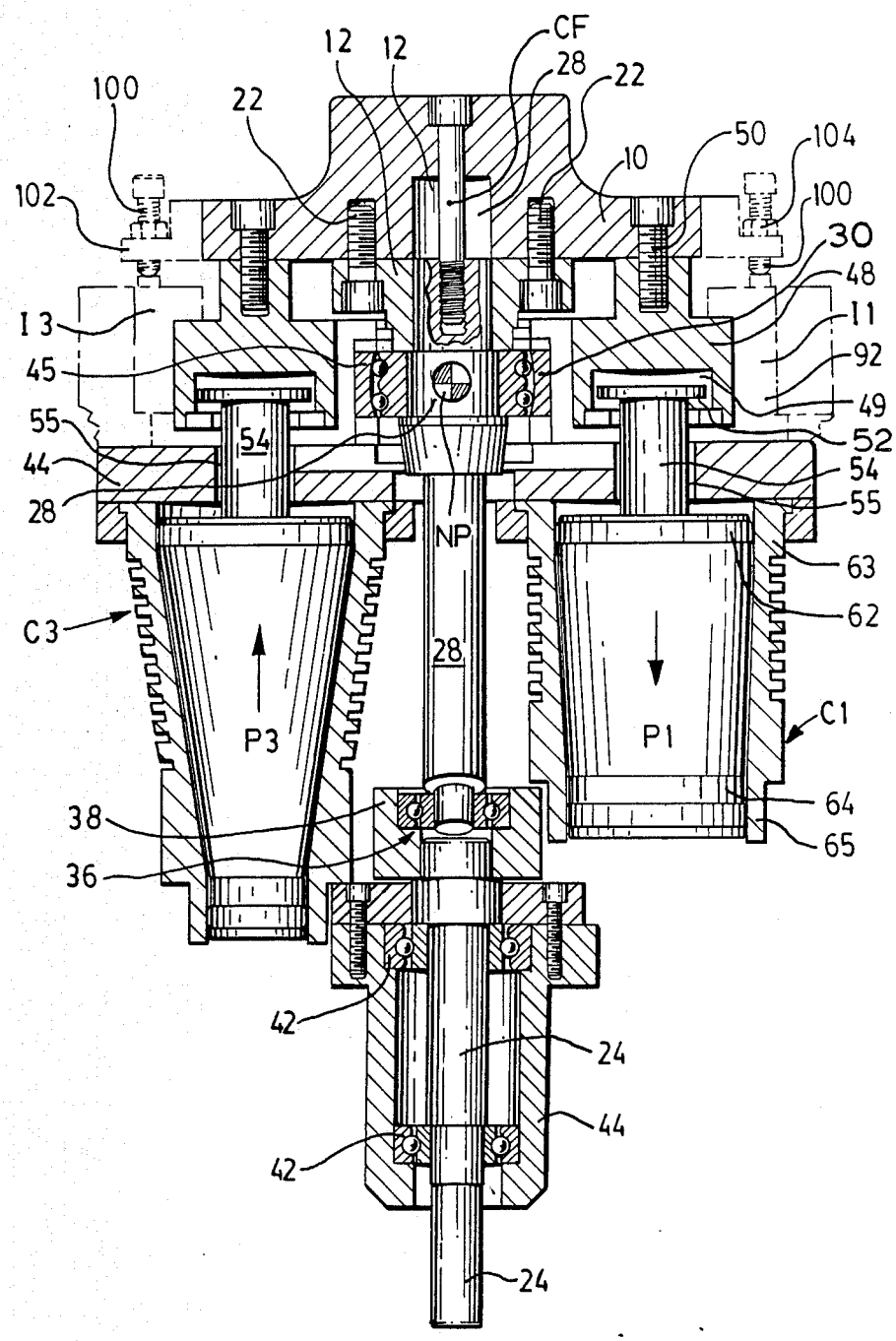
Figure 8:
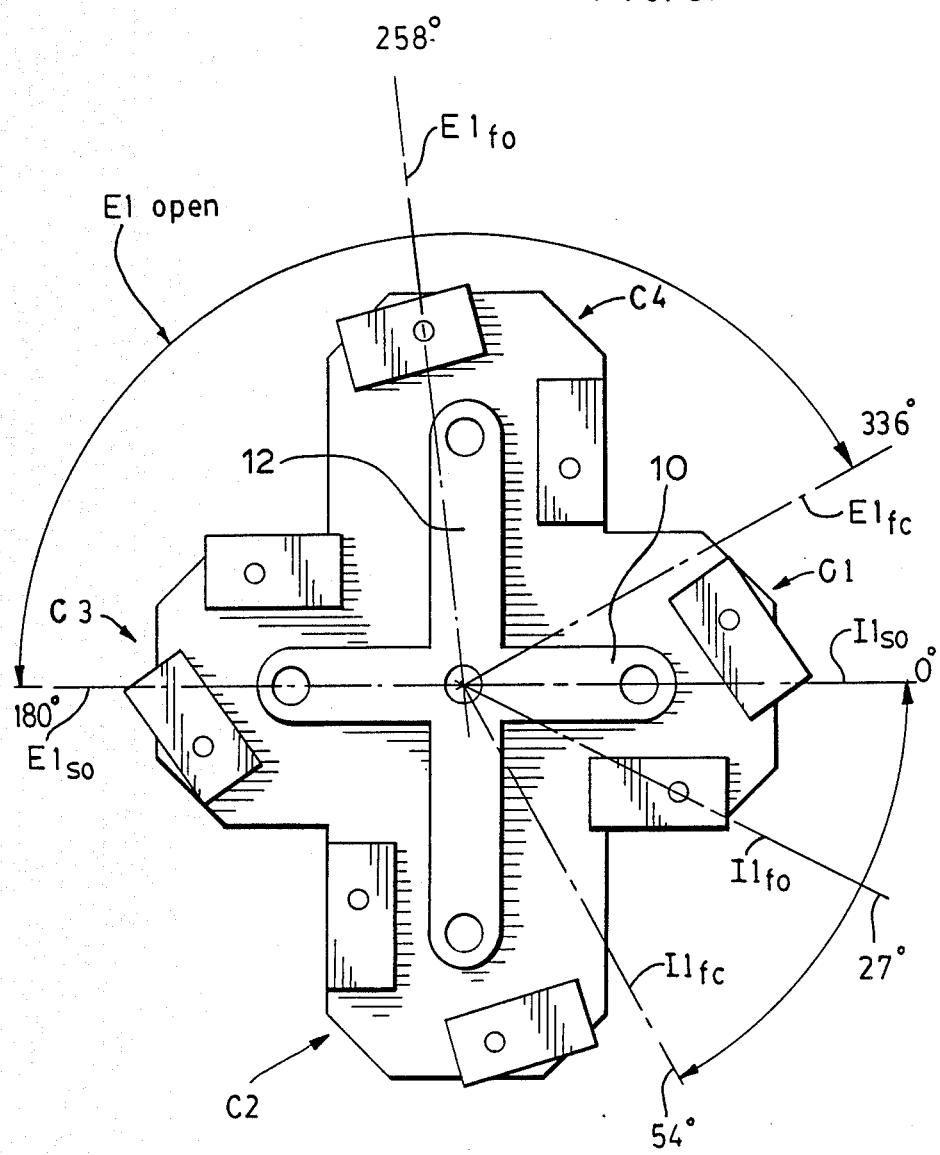
Figure 9:
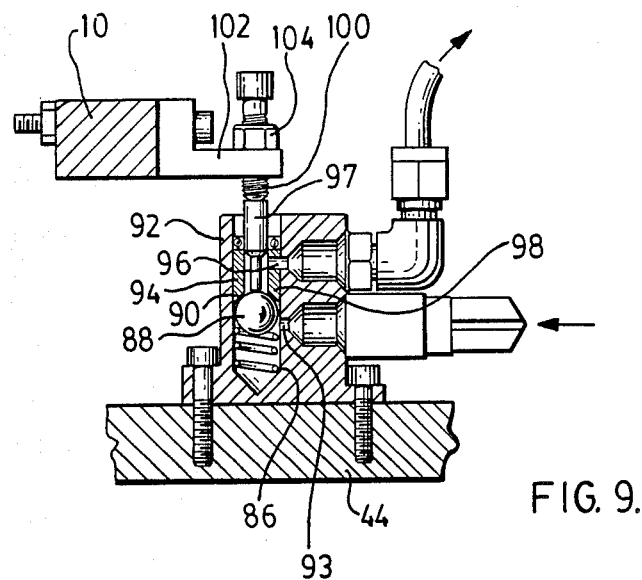
Figure 10:
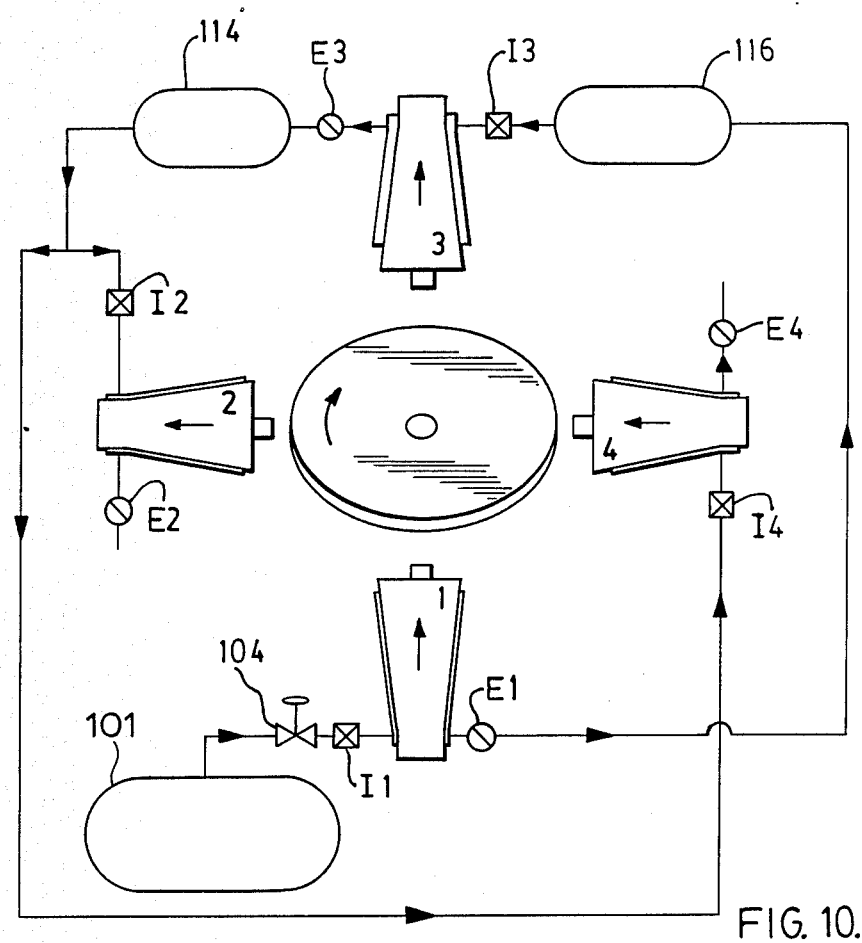

In the drawings which illustrate a preferred embodiment of the invention:

FIG. 1 is a schematic illustration of the nutation rotation drive with four reciprocating pistons, FIG. 2 illustrates schematically the use of an output rod on a nutating frame, to drive an output shaft, FIG. 3 is a plan view of the nutation frame and cylinders and showing the angular arrangement of the cylinders C1, C2, C3, C4, FIG. 4 is considerably simplified view of a section along the rotational axis showing the first and second stage cylinders, and taken along the lines 4,5—4,5 of FIG. 3 and showing the nutation frame 'nodding' toward the first stage C1, FIG. 5 is a more detailed view of a section along the rotational axis showing the first and second stage cylinders along the lines 4,5—,5 of FIG. 3 but with the nutation frame nodding toward C4, that is a stage 270° advanced angularly and in a phase from the position of FIG. 4, FIG. 6 is a section parallel to the rotational axis taken through one of the third stage cylinders C2 along the line 6—6 of FIG. 3, with the nutation frame nodding toward C2, FIG. 7 is a section parallel to the rotational axis taken through the other of the third stage cylinders C4 with the frame nodding toward C2 along the line 7—7 of FIG. 3, FIG. 8 is a plan view of the device showing the locations of the valves and valve actuators, FIG. 9 shows a detail of the valve actuation circuit; and FIG. 10 is a schematic view showing the conduit connections for transmission of gas to and between stages.

In FIGS. 1 and 2, the general operation of the nutation engine drive is illustrated. Thus a frame 10-12 is mounted at nutation point NP for limited universal movement to allow the frame to tilt or 'nod'in directions in a 360° azimuth about NP. Four pistons P1–P4 operating in cylinders C1–C4 are disposed at 90° angular intervals about the nutation and rotation axis. The nutation axis is represented by the line from the nutation point NP to the centre of the circle C of the frame shank while the rotation axis corresponds to the axis of shaft 24 of FIG. 2 and coincides with the nutation axis. The cylinders P1–P4 are reciprocated in the phase relationship (measured clockwise from piston P1) which corresponds to their angular disposition. The result is to rotate the frame 10-12 so that its 'nodding' direction (indicated in FIG. 1 by the dotted lines as directed at C1). A shank 28 aligned with nutation point NP and projecting at a narrow angle to the rotation axis has a free end which describes a circle as frame 10-12 nutates. FIG. 2 shows that the shank free end is anchored in a bearing crank CA with the bearing axis aligned with nutation point NP. It will readily be seen that the movement of shank 28 during nutation rotates the crank arm, driving crank in a circle and rotating the output shaft.

The schematic mode of operation shown is the mode of operation of the preferred embodiment to be described. In the preferred embodiment the crank arm, dimension CA that is the distance between bearing and rotary shaft centres is much shorter than indicated in FIG. 2.

FIG. 4 is the same section as FIG. 5 although in a different angular position. However FIG. 4 omits many parts to demonstrate the principle of operation and the moving and static parts.

In FIGS. 3–5 arms 10 and 12 which are mutually perpendicular comprise a rigid nutation frame and are connected to pistons which drive the frame as hereinafter described. The arm 12 is attached to the rearward side of arm 10 by bolts 22. The centre CF of arms 10 and 12 will be found to describe a circle about the rotation axis of output shaft 24 in accord with the nutation action of the frame 10-12 about nutation point NP. Nutation shank 28 is rigidly connected to frame 10-12. Nutation shank 28 extends through self aligning bearing 30. The end of shank 28 remote from frame 10-12 is mounted in rotary bearing 36 set in block 38. The block 38 is rigidly mounted on output shaft 24 for rotation therewith. Output shaft 24 is mounted on bearings 42 in stator frame 44. Stator 44 comprises all stationary portions of the device including cylinders C1, C2, C3, C4 and walls 45 forming the spherical outer race for bearing 30. Stator frame 44 will be mounted on an outboard motor mount if the engine is used as an outboard motor. Bearing 36 is eccentric relative to the shaft 24 and is therefore oriented at that angle to which the shaft maintains shank 28 axis with the predetermined eccentricity at its rearward end and its longitudinal axis toward it forward end passing over through the nutation point NP. Thus the longitudinal axis of shank 28 describes a cone whose apex is at nutation point NP and whose 'base'is the circle described by the axis of bearing 36.

Not shown in the drawings are the numerous seals required to maintain the engine sealed and to keep out the water in the $CO_2$ application.

In describing the connections to pistons and cylinders it is noted that such connections will only be described once since they are the same for each piston and cylinder. However pistons P1, P2, P3, P4 and cylinders C1, C2, C3, C4 while similar in principle are different in dimensions as shown.

With regard to the frame-piston connection, each free end of an arm 10 or an arm 12 is rigidly connected to a connector block 48 by a bolt 50. Connector block 48 is arranged to define a shallow cylindrical chamber 49 open toward the piston cylinder (C1, C2, C3 or C4), chamber 49 having the cylindrical plate 52 at the free end of piston rod 54 embedded in an elastomer (preferably silicone rubber) filling the chamber 49. Each piston rod 54 is slidably mounted in the sleeve 55 and defines the reciprocation axis of piston P1, P2, P3 or P4. Since each rod 54 merely reciprocates while each block 48 moves with a nutating or nodding motion, the elastomer 58 allows the small amount of flexure required to couple the respective motions.

Piston P1 reciprocates relative to a cylinder wall C1, which tapers rearwardly to define a truncated cone. Forwardly of the conical walls and rearwardly thereof stems 62 and 64, respectively, are provided forming extensions of the conical walls in each direction. The piston P1, rigidly fixed on the end of rod 54 is provided with truncated conical walls complementary to those of cylinder C1. The stems 62 and 64 slide respectively in on walls 63 and 65 respectively of cylinder C1. The forward and rearward cylindrical walls of the piston are provided with o-ring seals not shown. Admission of the compressed gas (to be described hereafter) to a chamber such as C1 when contracted in the chamber, forcing the piston P1 forwardly. The effective area of the piston for said forward pressure is only the radial (relative to the reciprocation axis) component of its conical wall area. However, the extent of the conical wall provides a very large area for thermal flow through C1 and to some extent along P1 to heat the gas and prevent its cooling to condensation temperature. Thus the cylinders and pistons are preferably constructed of material having high thermal conductivity and preferably of metal.

It is desirable that the gas expanding to drive piston P1 act only on the sloping surfaces of the piston for maximum use of their cooling effect. Accordingly cylindrical extension of stem 64 of the piston is dimensioned to exceed the piston stroke and overlap with the cylindrical wall C1 in extended position of the piston, so that the expanding gas has no access to a rearwardly facing face of the piston. For sealing the cylinder, the o rings seal with the stems 64 and 62 over the full extent of the piston stroke. The sectional view shown of piston-cylinder sets P1-C1 and P3-C3 only indicate inlet and outlet ports 72 and 74 to the chambers in dotted form . However the sectional view of piston-cylinder set P2-C2 FIGS. 6 and 7 shows inlet port 72, outlet port 74 and such ports will have the same design in all cylinders.

Poppet inlet valves I1 and I3 for the cylinders C1 and C3 are shown in dotted outline in FIG. 5. The location of inlet valves I1, I2, I3 and I4 and exhaust valves E1, E2, E3 and E4 is indicated in the plan view FIG. 8. The description of the poppet valve and its operation will follow.

Displaced at 180° (measured about the rotation axis) from chamber C1 is wall C3 defining the second stage cylinder and containing piston P3. The mounting, general shape and principal of operation of piston P3 is the same as piston P1 and will not be described here in detail. As will be noted from the arm 10 in dimensions shown in FIG. 8, the arm 10 radius from the rotation axis to piston P3 and hence the stroke thereof will be the same as for piston P1. However the maximum capacity of the chamber in cylinder is increased by increasing the angle of the chamber walls and by increasing the cylinder length, both as shown. Thus the increased chamber volume associated with piston P3 is to accommodate the larger volume which the gas will possess since piston-cylinder P1-C1 represents the first stage of the gas expansion and piston-cylinder P3-C3 represents the second stage.

Piston P2 complementary to chamber C2 is disposed 90° clockwise from piston P1. A piston P4 identical to piston P2 complementary to chamber C4 is 270° disposed clockwise from piston P1. The piston-chamber pairs at 90° and 270° respectively shown in FIGS. 6 and 7 have the same type of connection, chamber mounting, piston mounting, general shape and operating characteristics as the piston-chambers pairs P1-C1 and P3-C3. Both pistons P2 and its opposite P4 are truncated cones complementary to their chamber C2 and C4, respectively, and receive $CO_2$ for expansion in the gas' third and last expansion stage. The arm 12 length to the piston reciprocating axes is longer than for the pistons on arm 10, (see FIG. 8) hence the piston stroke is longer. In chambers C2 and C4 the angle of the chamber walls to the reciprocation axis is greater and the cylinder is longer than with chamber P3. Each of these parameters increase the volume of each of the chambers C2 and C4. Moreover the diameter of the wide end of the cones P2-C2 and P4-C4 is larger than the wide end of P1-C1 and P3-C3, further increasing the effective chamber volume. Both cylinders C2 and C4 provide their chamber volumes for the third stage of expansion. As previously noted a much larger area heat flow path is provided when two chambers C2 and C4, instead of one, are used for the direct expansion stage.

It is now desired to describe the construction of the poppet valve which is the embodiment for inlet valves I1, I2, I3, I4 and exhaust valves E1, E2, E3, E4, and then describe the angular disposition of the nutation frame for the opening and closing of inlet valve I1 and exhaust valve E1. It will then be understood that the operation of valves I2-I4 and E2-E4 is identical and displaced at sequential 90° intervals from the operating points I1 and E1, respectively.

The design of the poppet valves is as follows (FIG. 9). The valve body 92 has an upwardly open well wherein a compression spring 86 biases ball 88 upward against seat 90. Body 92 holds the valve sleeve and defines valve inlet passage 93 below the valve seat and valve outlet passage 96 above the seat. Body 92 is attached as shown to a portion of the stator frame 44 and shown in dotted form in FIG. 5. Sleeve 94 is located to line the wall above ball 88 and its lower surface forms the seat 90. Slidable in sleeve 94 is the cylindrical slug 97 which bears downwardly on ball 88. Vertical grooves 98 shown in the side wall of slug 96 extend sufficiently high from the bottom of slug 96 to provide communication of gas flowing through valve seat in all design positions of slug 96. However the grooves 98 stop sufficiently short of the top of the body 92 to prevent escape of gas from the top of the wall in any valve positions. Frame 10-12 is provided with an actuator bolt 100 located and oriented to bear on the upper end of slug 96 during a portion of a nutation cycle. Bolt 100 is threaded in arm 102 of frame 10-12 and lock nut 104 allows adjustment of bolt 100 at a selected depth. In the nutation cycle of frame 10-12 the end of bolt 100 will describe an almost sinusoidal vertical oscillation. The downward projection of bolt 100 is therefore adjusted so that requisite portion of its downward excursion is used to open the valve in question for the requisite horizontal angular travel of the depression direction of nutation frame. For inlet valve I1 and exhaust valve E1 associated with piston-cylinder combination P1 - C1 such angles are shown in FIG. 8. Thus treating the azimuth angle for full depression of piston P1 as 0° for the horizontal nutation cycle angle, the inlet valve I1 for cylinder C1 starts to open at 0°, labelled $I1_{so}$, is fully open at 27° labelled $I1_{fo}$ and closes at 54° $I1_{fc}$. The outlet valve E1 for cylinder C1 starts to open at 180° labelled $E1_{so}$, is fully open at 258° '$E1_{fo}$' and is fully closed at 336° '$E1_{fc}$'. (Thus $I1_{fo}$ corresponds to the full depression of ball 88 in valve I1 and $E1_{fo}$ corresponds to the full depression of ball 88 in valve E1). Thus gas is admitted to cylinder C1 over azimuth angles 0° to 54° —and expands to drive P1 upwardly from 54° to 180° (some expansion will begin before 54°). From 180° to 336° gas is exhausted from C1 from 336° to 0° the small amount of gas remaining unexhausted is compressed and expands with the new gas admitted after 0°. (It will be noted that bolt 100 is separated from slug 96 in any valve during the portion of the nutation cycle when it is not depressing the slug).

Valves I2-I4, E2-E4 operate as described for valves I1, E1 respectively at angular locations sequentally advanced 90° clockwise from the respective positions shown for I1, E1.

In general the parameters relating to available chamber volume for expansion: angle of chamber taper, tapered wall length, piston stroke length, diameter of wide end of cone and number of chambers per stage (in each case the piston being complementary to the chamber wall) are calculated to fit the amount of expansion and expansion capacity at each stage.

With the valving and gas connections to be described hereafter, it will be understood that the nutation drive occurs by the expansion of gas in chambers C1, C2, C3, C4 in cyclical sequence corresponding to their angular disposition causing cyclical nutation of frame 10-12 causing shank 28 to describe a cone with its apex at nutation point NP and causing bearing 36 to describe a circle about shaft 24. The extent CA between the center of bearing 38 and the axis of shaft 24 represents the length of the crank arm whereby the circular motion of bearing 38 causes rotation of output shaft 24 (which will mount a propeller in the outboard motor application). During cyclical operation of the pistons the heat flow through the chamber walls heats the expanding gas tending to prevent condensation.

The gas supply and exhaust from the chambers during the operation of the motor will now be described. The connections are as shown in FIG. 10. The $CO_2$ gas supply is contained in tank 101 connected to the inlet valve I1 through shut off valve 104. Shut off valve 104 is open throughout the operation to be described.

The operation will be described with nutation frame at the position when piston P1 is at its lowest excursion in chamber C1, (this being azimuth angle 0°)(FIG. 8) piston P3 is raised to open the full capacity of chamber C3 (see FIG. 4) and piston P2 is at intermediate position and moving toward contraction position, and the opposite piston P4 is at intermediate position and opening. The cycle will be described for piston chamber P1-C1 and valves I1 and E1. The cycle is the same for P2-C2, P3-C3, P4-C4 at 90°, 180° and 270° phase lags from the operation described. As the depressed direction of the frame starts to move clockwise from an orientation toward piston P1 to an orientation toward piston P2, the inlet valve I1 of chamber C1 is opened at 0° and $CO_2$ flows from the tank two to chamber C1.

As the depressed orientation of the nutation frame passes 54° valve I1 to chamber C1 closes and piston P1 continues to move to expanded position under the pressure of the gas expanding therein.

As the depressed orientation of the nutation frame passes chamber C3, the exhaust valve E1 for chamber C1 is opened. Piston P1 is starting to contract after this point and pushes its used charge out to accumulator 116.

As the depressed orientation of the frame passes 336° E1 closes and as the depressed orientation of the nutation frame passes chamber C1, the cycle is repeated.

Exhaust valve E1 is located on a line connecting cylinder C1 to accumulator 116. Accumulator 116 (and accumulator 114 to be described) are devices well known to those skilled in the art and have a number of conventional forms designed to hold a variable volume of gas at a selected pressure. The pressure in the variable volume chamber may be maintained by spring bias, pneumatic or hydraulic bias.

Operations of piston-chamber P2-C2 and I2 and E2 occur as described for the corresponding components in P1-C1 but at phase and azimuth angles respectively trailing by 90°. The gas to I2 for chamber C2 is supplied from accumulator 114 which is supplied as hereinafter described. The gas exhausted through E2 is released to atmosphere.

Operations of piston chamber P3-C3, I3 and E3 are similar to those for P1-C1 but at phase and azimuth angles respectively trailing 180°. Gas for C3 is supplied by accumulator 116, when the valve I3 is open. Gas exhausted from C3 when E3 is open is supplied to accumulator 114.

Operations of piston-chamber, P4-C4 I4 and E4 are similar to those for P1-C1 but at phase and azimuth angles respectively trailing by 270°. Gas for C4 is supplied from accumulator 114 when I4 is open. Gas exhausted from C4 when E4 is open is released to atmosphere.

The preferred operating conditions for $CO_2$ gas (treat as exemplary only) of the three stage engine are set out in table A below. It will be noted that stage 3 relates to the joint operation of P2-C2 and P4-C4.

TABLE A

| Stage | Summary of Results | | |
|---|---|---|---|
| | 1(P1-C1) | 2(P3-C3) | 3(P2-C2 plus P4-C4) |
| Admission Volume. | 0.50(0.03) | 2.4(0.15) | 11(0.67) |
| Displacement. | 2.4(0.15) | 11(0.67) | 53(3.3) |
| Admission Pressure. | 58(831) | 20(290) | 5(67) |
| Exhaust Pressure. | 20(290) | 5(67) | 1(15) |
| Mean Effective Pressure. | 33(485) | 9(129) | 2(28) |
| Work Done. | 6.3(6.0) | 7.9(7.5) | 8.2(7.8) |
| Heat Transferred. | 12.1(11.5) | 9.0(8.5) | 8.5(8.1) |

Units of volume are c.c. or (c.i.).
Units of pressure are bar absolute or (p.s.i.a.).
Units of work are Joules or (Btu(thousandsths)).
Units of heat are Joules or (Btu(thousandsths)).

All valves given herein and for other parameters such as valve operating angles are exemplary only and are not intended to limit the scope of the invention in any.

I claim:

1. Compressed gas piston and cylinder having a piston reciprocable and defining a reciprocation axis relative to a cylinder defining a variable volume chamber, wherein:
    said cylinder has walls tapering in one sense of said reciprocation direction, said taper being less than 45° to said direction,
    a piston shaped to be complementary to said cylinder whereby during reciprocation of said piston a variable volume chamber is defined, wherein the wall area defining said chamber is mainly composed of tapering piston and chamber walls,
    means for admitting compressed gas to said chamber to cause expansion movement of said piston, and means allowing escape of gas from said chamber during contraction movement of said piston.
    wherein a stem of uniform cross section in the reciprocation direction projects from the narrow end of the tapering walls of said piston, and the cylinder is shaped to provide a bore complementary to said stem, said stem and said bore being so arranged that said stem remains in said bore in the extended position of said piston.

2. Compressed gas piston and cylinder as claimed in claim 1 wherein cooperating means are provided between said piston and said defining walls to prevent expanding gas acting on substantial non-tapering surfaces on said piston.

3. Compressed gas piston and cylinder as claimed in claim 1 wherein the walls defining said chamber are predominately made of metal.

4. Compressed gas piston and cylinder as claimed in claim 3 wherein cooperating means are provided between piston and said defining walls to prevent expanding gas acting on substantial non-tapering surfaces on said piston.

5. A device as claimed in claim 1 wherein said taper is less than 10° to said direction.

6. Compressed gas piston and cylinder having a piston reciprocable and defining a reciprocation axis relative to a cylinder defining a variable volume chamber, wherein:
    said cylinder has walls tapering in one sense of said reciprocation direction, said taper being less than 45° to said direction,
    a piston shaped to be complementary to said cylinder whereby during reciprocation of said piston a variable volume chamber is defined, wherein the wall area defining said chamber is mainly composed of tapering piston and chamber walls,
    means for admitting compressed gas to said chamber to cause expansion movement of said piston and means allowing escape of gas from said chamber during contraction movement of said piston,
    wherein the walls defining said chamber are predominately metal,
    wherein a stem of uniform cross section in the reciprocation direction projects from the narrow end of the tapering walls, and the material defining the chamber walls is shaped to provide bore complementary to said stem, said stem and bore being so arranged that said stem remains in said bore in the extended position of said piston.

7. Compressed gas engine as claimed in claim 6 wherein cooperating means are provided between each said piston and defining walls of the corresponding chamber to prevent expanding gas acting on substantial non-tapering surfaces of said piston.

8. A device as claimed in claim 6 wherein said taper is less than 10° to said direction.

9. Compressed gas engine with nutating drive for an output rotating shaft defining a rotating axis, including:

at least three piston-cylinder sets, each set comprising relatively reciprocal piston and cylinder each defining a reciprocation axis having its major component parallel to the rotation axis, a nutation frame mounted to nutate about a nutation point, said mounting allowing sufficient universal movement for said frame to nutate under activation of said pistons, connections between the movable component of said piston-cylinder sets and said frame angularly disposed about said nutation point relative to said rotary axis, said connections allowing coupling of the reciprocating action of said pistons to cause nutation of the nutation frame, whereby operation of said pistons in selected phase relationship causes nutation of said frame, a rod projecting from said frame to a location spaced in an axial direction, relative to said axis of shaft rotation from said nutation point, a crank on said output shaft connected to said rod at said location to allow relative rotation about the axis of said rod, whereby said rod causes rotation of said output shaft, each of said at least three piston-cylinder sets comprising a piston tapering in said reciprocation direction at an angle of less than 45° thereto and a means defining a complementary shaped cylinder, whereby during reciprocation of said piston a variable volume chamber is defined between said piston and cylinder, wherein the wall are defining said chamber is mainly composed of tapering piston and chamber walls, means for admitting gas at a higher pressure to and allowing the escape of compressed gas at a lower pressure from said cylinders at times to produce operation of said piston in said selected phase relationship, wherein a stem of a uniform cross section in the reciprocation direction projects from the narrow end of the tapering walls of said piston, and the material defining the chamber walls is shaped to provide a bore complementary to said stem, said stem and said bore being so arranged that a portion of said stem remains in said bore in the extended position of said piston.

10. Compressed gas engine as claimed in claim 9 wherein cooperating means are provided between each said piston and defining walls of the corresponding chamber to prevent expanding gas acting on substantial non-tapering surfaces of said piston.

11. Compressed gas engine as claimed in claim 9 wherein the walls defining said chamber are predominately made of metal.

12. Compressed gas engine as claimed in claim 11 wherein:

one of said combinations is connected to act as the first stage of expansion of the compressed gas, second of said combinations is connected to act as the second stage of expansion of the compressed gas, the third and fourth of said combinations connected to act as the third stage of expansion of the said compressed gas, the volume of each chamber at expanded positions of said pistons being controlled by the parameters:

angle of taper chamber length stroke length the combined expanded chamber volume of said third and fourth combination is greater than the volume of said second combination which in turn is greater than the volume of said first combination.

13. A device as claimed in claim 11 wherein said angle is less than 10°.

14. Compressed gas engine as claimed in claim 9 wherein four piston-cylinder combinations are provided, angularly disposed about the rotation axis.

15. Compressed gas engine as claimed in claim 14 wherein:

one of said combinations is connected to act as the first stage of expansion of the compressed gas, a second of said combinations connected to act as the second stage of expansion of the compressed gas, the third and fourth of said combinations connected to act as the third stage of expansion of said compressed gas, the volume of each chamber at expanded positions of said piston being controlled by the parameters:

angle of taper chamber length stroke length the design controlling such parameters so the combined expanded chamber volume of said third and fourth combinations is greater than the volume of the expanded chamber of said second combination, which in turn is greater than the expanded chamber volume of said first combination 16. A device as claimed in claim 9 wherein said angle is less than 10°.

* * * * *